US011356495B2

(12) United States Patent
Malik et al.

(10) Patent No.: US 11,356,495 B2
(45) Date of Patent: Jun. 7, 2022

(54) RESTORE URL CONTEXT FOR PROXIES

(71) Applicant: Microsoft Technology Licensing, LLC, Redmond, WA (US)

(72) Inventors: Vikas Malik, Bellevue, WA (US); Nir Mardiks Rappaport, Bellevue, WA (US); Idan Gadot, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/084,350

(22) Filed: Oct. 29, 2020

(65) Prior Publication Data

US 2022/0141278 A1 May 5, 2022

(51) Int. Cl.
| | |
|---|---|
| *H04L 67/02* | (2022.01) |
| *H04L 61/59* | (2022.01) |
| *H04L 67/563* | (2022.01) |
| *G06F 16/954* | (2019.01) |
| *H04L 101/355* | (2022.01) |
| *G06F 3/0483* | (2013.01) |
| *G06F 16/955* | (2019.01) |

(52) U.S. Cl.
CPC ............ *H04L 67/02* (2013.01); *G06F 3/0483* (2013.01); *G06F 16/954* (2019.01); *G06F 16/9562* (2019.01); *H04L 61/3055* (2013.01); *H04L 61/6013* (2013.01); *H04L 67/2814* (2013.01)

(58) Field of Classification Search
CPC . H04L 67/02; H04L 61/6013; H04L 61/3055; H04L 67/2814; G06F 16/954; G06F 3/0483
See application file for complete search history.

(56) References Cited

U.S. PATENT DOCUMENTS

| | | | |
|---|---|---|---|
| 10,417,296 B1* | 9/2019 | Matsuoka | ............ G06F 16/9566 |
| 2014/0351418 A1* | 11/2014 | Toubiana | .............. H04L 67/289 |
| | | | 709/224 |
| 2016/0044124 A1 | 2/2016 | Sarukkai et al. | |
| 2016/0270020 A1* | 9/2016 | Adrangi | .................. H04L 67/02 |

(Continued)

FOREIGN PATENT DOCUMENTS

WO 2015070260 A1 5/2015

OTHER PUBLICATIONS

"International Search Report and Written Opinion Issued in PCT Application No. PCT/US2021/043810", dated Nov. 11, 2021, 11 Pages.

*Primary Examiner* — Gil H. Lee
*Assistant Examiner* — Chhian (Amy) Ling
(74) *Attorney, Agent, or Firm* — Mannava & Kang, P.C.

(57) ABSTRACT

According to examples, an apparatus may include a processor that may identify a navigation event responsive to a URL being entered into an address bar of a web browser, the URL having a domain and a URL component, and may determine whether the web browser received an instruction to navigate to a return URL, in which the return URL includes a suffix domain for a proxy and does not include the URL component. The processor may also, based on a determination that the web browser received the instruction to navigate to the return URL, generate a modified URL by appending the suffix domain to the URL to restore context of the URL for the proxy and navigate the web browser to the modified URL.

20 Claims, 5 Drawing Sheets

(56) References Cited

U.S. PATENT DOCUMENTS

| | | | |
|---|---|---|---|
| 2017/0193122 A1* | 7/2017 | Wright | G06F 16/954 |
| 2018/0254896 A1* | 9/2018 | Moysi | H04L 9/3268 |
| 2019/0036871 A1* | 1/2019 | Lapidous | H04L 63/0281 |
| 2019/0258473 A1* | 8/2019 | Vishnepolsky | G06F 21/53 |

* cited by examiner

RESTORE URL CONTEXT FOR PROXIES

BACKGROUND

A proxy server may be a server application and/or device that may operate as an intermediary for requests from clients for resources from servers that provide the resources. The proxy server may operate on behalf of a client when the client submits a request for a resource. As a result, instead of connecting directly to a server that may fulfill the request for the resource, the client may direct the request to the proxy server, which may evaluate the request and may perform network transactions to fulfill the request. The proxy server may function to simplify or control the complexity of fulfilling the request and may provide security and/or privacy to the clients.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
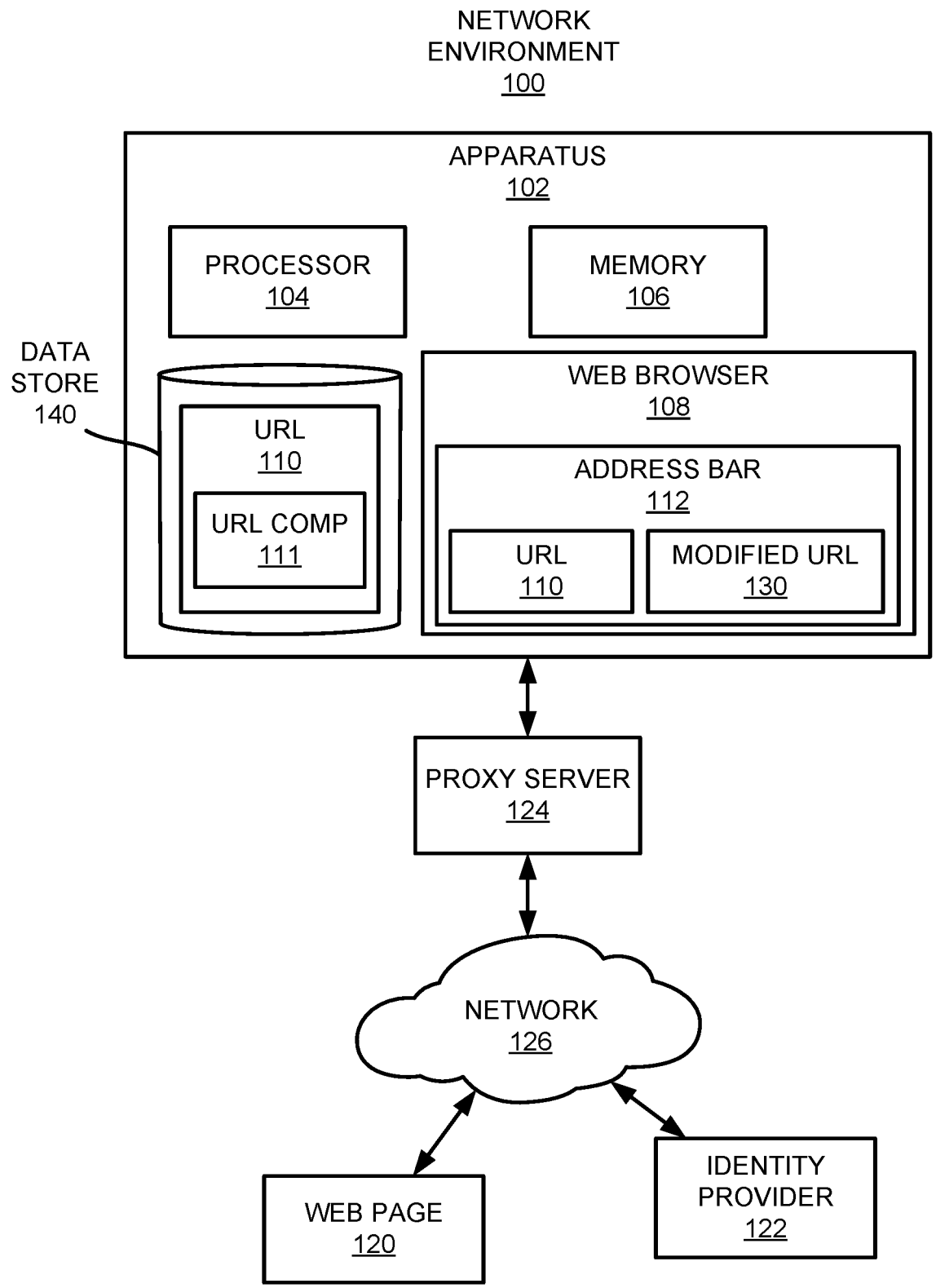
FIG. 1 shows a block diagram of a network environment, in which an apparatus may navigate a web browser to a modified URL, and in which the modified URL may include a suffix domain of a proxy server and a URL component to cause the web browser to navigate to a web page corresponding to the URL component via the proxy server, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

A proxy server may receive a request from a client device to be directed to a URL, in which the URL may include a certain domain and a certain URL component. The certain URL component may be a certain subdirectory, a certain query string, a certain fragment part, and/or the like of the URL and may correspond to, for instance, a web page that may be accessible through a landing page corresponding to the certain domain listed in the URL. In some instances, for instance, when the certain domain includes a number of web pages and/or when the web page corresponding to the certain URL component is embedded among a number of web pages, navigating to the web page corresponding to the certain URL component from the landing page of the certain domain may be time-consuming and may require extra resource and energy consumption on the client device.

In instances in which the user of the client device is to be authenticated prior to being granted access to the web page corresponding to the URL, the proxy server may redirect the web browser of the client device to an identity provider. Generally speaking, the identity provider may provide authentication and/or authorization services for service providers. The proxy server may append a suffix domain to the URL and may send the URL with the appended suffix domain to the identity provider for the identity provider to authenticate the user to be authorized to access the web pages corresponding to the URL. The identity provider may authenticate the user and if authenticated, may interact with the service provider of the web page corresponding to the URL such that the service provider may identify the user as being authentic when the user logs into the web page. The identity provider may also send a return URL to the proxy server, in which the return URL may not include the URL component that was included in the original URL. Instead, the return URL may include the original domain and the suffix domain of the proxy server. The proxy server may also communicate the return URL to the client device, such that the web browser on the client device may navigate to the return URL.

As discussed above, because the return URL may not include the URL component that was included in the original URL, when the web browser navigates to the return URL, the web browser may navigate to a proxy landing page. That is, the web browser may navigate to the landing page corresponding to a URL that includes both the domain and the suffix domain of the proxy, e.g., the proxy server, instead of the web page corresponding to the URL component that may be accessible through the proxy landing page. A technological issue with proxy servers redirecting client requests to identity providers may be that such redirections may result in the URL component listed in the URL being removed and the web browser being navigated to a proxy landing page URL instead of the URL having the URL component. The user may thus be required to navigate through multiple other web pages prior to reaching the web page corresponding to the URL component, which may result in extra energy and resource consumption by a processor of the client device.

Disclosed herein are apparatuses, methods, and computer-readable media that may enable a web browser to navigate directly to a web page corresponding to a URL component listed in an original URL following redirection of the web browser to an identity provider by a proxy server. Particularly, a processor may identify a navigation event responsive to a URL being entered into an address bar of a web browser, in which the URL may list a domain. The processor may also determine whether the web browser received an instruction to navigate to a return URL, in which the return URL may include a suffix domain and does not include the URL component that was included in the original URL. That is, for instance, the processor may determine whether the web browser received a return URL from the proxy server that includes a suffix domain and does not include the URL component from the original URL as may occur when the proxy server redirected the URL to an identity provider as discussed herein.

The processor may, based on a determination that the web browser received the instruction to navigate to the return URL, generate a modified URL by appending the suffix domain to the URL to restore the context of the URL for the proxy, e.g., proxy server. In addition, the processor may navigate the web browser to the modified URL. By generating the modified URL, which may include the suffix domain of the return URL and the URL component listed in the original URL, the web browser may directly navigate to the web page corresponding to the URL component. As a result, the processor may avoid having to navigate from the web page corresponding to the return URL to the web page corresponding to the URL component as may have been necessary in conventional client devices. A technological improvement afforded through implementation of the features of the present disclosure may be that the amount of processing resources and energy consumed may be reduced and/or minimized to navigate a web browser to a web page corresponding to an intended URL component through generation of the modified URL and navigation to the modified URL as discussed herein.

Figure 2:
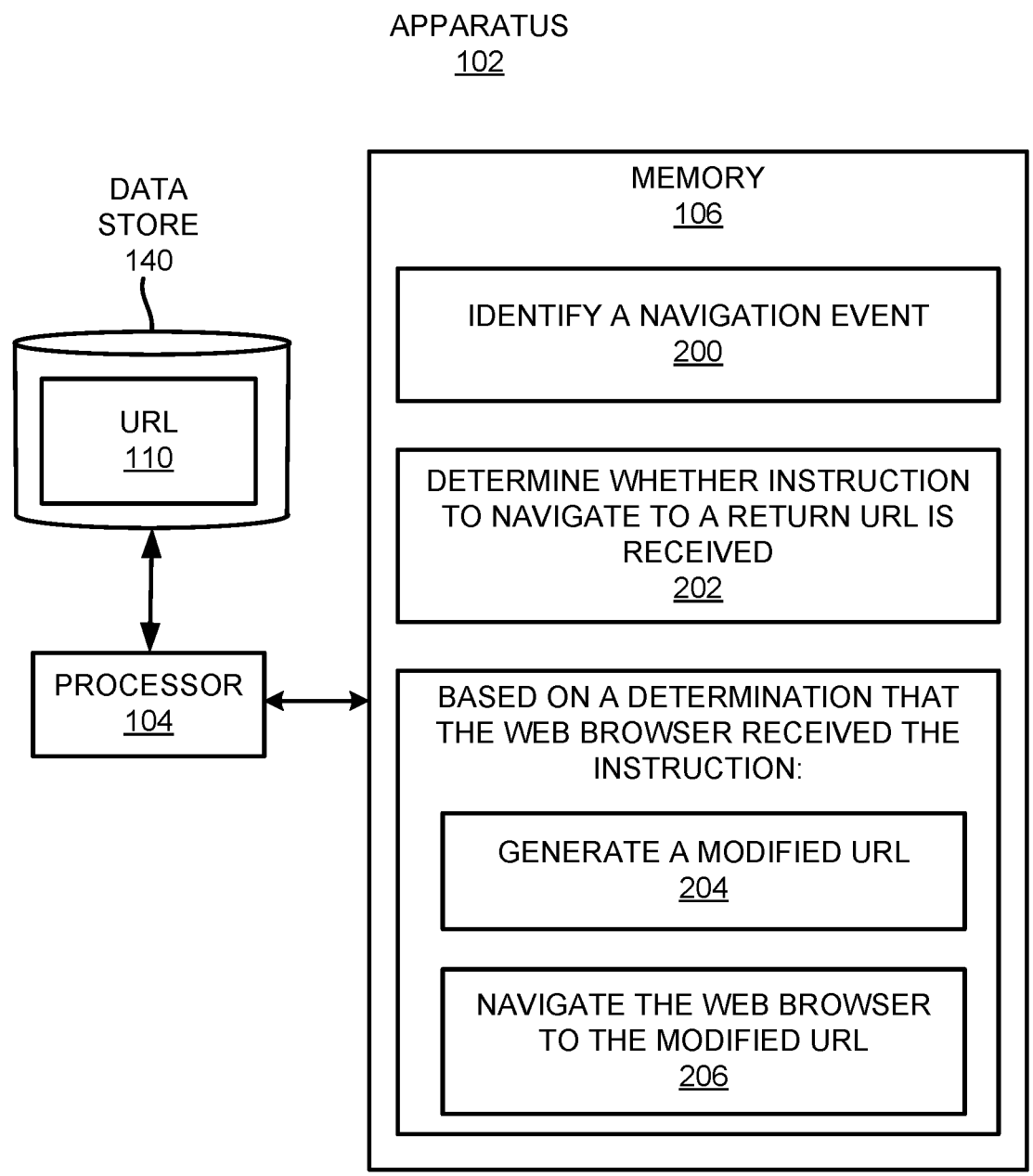
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may navigate a web browser to a modified uniform resource locator (URL), and in which the modified URL may include a suffix domain and a URL component to cause the web browser to navigate to a web page corresponding to the URL component via a proxy server, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 of the network environment 100 may include additional features and that some of the features described herein may be removed and/or modified without departing from the scopes of the network environment 100 and/or the apparatus 102.

The apparatus 102 may include a processor 104 that may control operations of the apparatus 102 and a memory 106 on which data that the processor 104 may access and/or may execute may be stored. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

According to examples, the apparatus 102 may be a computing device, such as a laptop computer, a tablet computer, a smartphone, or the like, through which a user may access web pages through a web browser 108 that may be executing on the apparatus 102. In some examples, the user may input or otherwise cause to be inputted a URL 110 having a domain and a URL component 111 into an address bar 112 of the web browser. The URL 110 may thus be directed to particular URL component 111 of the domain, e.g., a "favorites" subdirectory. By way of non-limiting example in which the URL component 111 includes a subdirectory, the URL 110 may have the domain "www.xyz.com" and a subdirectory appended to the end of the domain. For instance, the URL may have a form similar to http://www.xyz.com/subdirectory. The subdirectory may correspond to a web page that may be accessible from a landing page of the "www.xyz.com" domain.

In addition, or alternatively, the URL component 111 may include a query string of the URL, e.g., a section of the URL that contains a "?". As a further example, the URL component 111 may include a fragment part of the URL, e.g., a section of the URL that contains or follows a "#". An example of a URL that includes a query string ("lang") and a fragment part ("section2") is: "https://xyz.com/sample/help.html?lang=US#section2."

In various examples, the user may type the URL 110 into the address bar 112, paste the URL 110 into the address bar 112, follow a link (e.g., from an email, a bookmark, or the like) that causes the URL 110 to be entered into the address bar 112, and/or the like. In other examples, the URL 110 may be a redirect to the URL 110 by an application (e.g., by a javascript that automatically redirects to the URL 110), and/or the like. In addition, once the user executes the URL 110, the web browser 108 may attempt to navigate to the web page 120 corresponding to the URL 110. In some instances, the web browser 108 may navigate to the web page 120 corresponding to the URL 110 either directly or via one or more redirects. In other instances in which the user is to be authenticated and/or authorized prior to being granted access to the web page 120 corresponding to the URL 110, the web browser 108 may navigate to an identity provider 122 prior to navigating to the web page 120. As shown in FIG. 1, the web browser 108 may navigate to the web page 120 and/or be redirected to an identity provider 122 over a network 126, which may be the Internet, a wide area network, and/or the like.

The identity provider 120 may provide authentication and authorization services to, for instance, service providers of resources, web pages, etc. That is, when the user attempts to sign into the web page 120, the service provider of the web page 120 may not know how to authenticate the user and thus, may delegate that determination to the identity provider 122. The web browser 108 may be redirected, e.g., based on a user request to access the web page 120, to a URL that is hosted on the identity provider 122. In addition, the user may enter their username, password, and/or other credential that the identity provider 122 may use to authenticate the user. If authenticated, the identity provider 122 may redirect back to the service provider and provide some claims that the user has been authenticated and the service provider may allow the user to access the web page 120 via the web browser 108. The identity provider 122 and the service provider may employ any suitable authentication process to authenticate the user and to allow or reject access by the user to the web page 120.

In some instances, the web browser 108 may direct the navigation to the URL 110 to a proxy server 124 that may operate as a proxy for the apparatus 102, in which case the proxy server 124 may operate as a suffix proxy. The proxy server 124 may provide functionality, security, and/or privacy to the apparatus 102 and/or the user of the apparatus 102. In these instances, the proxy server 124 may append a suffix domain of the proxy server 124 to the URL 110 and may send the URL 110 with the suffix domain to the identity provider 122. For instance, the proxy server 124 may append the following type of suffix domain http://www.xyz-.com.suffixproxy.com to the URL. In addition, or alternatively, the proxy server 124 may operate as a return or reverse proxy for the apparatus 102.

Following authentication of the user, the identity provider 122 may provide some claims that the user has been authenticated to the service provider. The identity provider 122 may also send a return URL to the proxy server 124 and the proxy server 124 may communicate the return URL to the apparatus 102. The return URL may be the same as the URL that the proxy server 124 sent to the identity provider 122 or may be different from that URL. In some instances, a service provider may store the URL in the web browser's 108 local-storage, session-storage, cookie, or the like, with the domain of the URL (e.g., www.xyz.com) before redirecting the URL to the identity provider 122. After the user is authenticated, the user lands on the suffix domain landing page, e.g., www.xyz.com.suffixproxy.com. As a result, the service provider may not be able to read the original URL from the location at which the URL was stored, e.g., the local-storage, session-storage, cookie, or the like.

The return URL sent by service provider to the identity provider 122 may be the URL where claims are returned by the identity provider 122 and thus, the return URL may be different than the original URL 110. Some service providers may also pass the original URL 110 in a state field (the name of the field may be different in different protocols) to the identity providers. In these examples, the proxy server may remove/lose the original URL 110 passed in the state field. In any event, the return URL may not include the URL component 111 that was in the original URL 110.

Normally, the processor 104 may insert the return URL into the address bar 112 and may navigate to the return URL. As a result, instead of landing at the web page 120 corresponding to the URL component 111 listed in the original URL 110, the user may land on a web page that corresponds to a landing page of the domain and suffix domain when the web browser 108 is navigated to the return URL. The user may be required to navigate through a number of pages to get to the web page corresponding to the URL component 111 that was listed in the original URL 110. In some cases, for instance, when the URL component 111 is embedded in multiple pages, the navigation through the web pages may consume a great deal of time and may cause the processor 104 to consume additional resources while the user is navigating through the pages.

As a result, omission of the URL component 111 from the return URL during the authentication process when a proxy server 124 is implemented may cause inefficiencies, particularly with respect to processor 104 resource and energy consumption. According to examples, and as discussed herein, the processor 104 may generate a modified URL 130 that may include both the suffix domain and the URL component 111 such that the web browser 108 may navigate to the web page 120 corresponding to the intended URL component 111 following redirection to the identity provider 122 by the proxy server 124.

As shown in FIG. 2, the memory 106 may have stored thereon machine-readable instructions 200-206 that the processor 104 may execute. Although the instructions 200-206 are described herein as being stored on the memory 106 and may thus include a set of machine-readable instructions, the apparatus 102 may include hardware logic blocks that may perform functions similar to the instructions 200-206. For instance, the processor 104 may include hardware components that may execute the instructions 200-206. In other examples, the apparatus 102 may include a combination of instructions and hardware logic blocks to implement or execute functions corresponding to the instructions 200-206. In any of these examples, the processor 104 may implement the hardware logic blocks and/or execute the instructions 200-206. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to identify a navigation event responsive to a URL 110 being entered into an address bar 112 of a web browser 108. As discussed herein, the URL 110 may include a domain and a URL component 111. The processor 104 may track the web browser 108 to determine when the URL 110 is entered into the address bar 112, for instance, through a plug in and/or extension installed on the web browser 108. In addition, the navigation event may be any type of event in which the URL 110 is added to the address bar 112. In some examples, the processor 104 may determine whether the identified navigation event is a predefined type of event. In these examples, based on a determination that the identified navigation event is a predefined type of event, the processor 104 may store the URL 110, for instance, in a data store 140. The data store 140 may be a Random Access memory (RAM), an Electrically Erasable Programmable Read-Only Memory (EEPROM), a storage device, or the like. However, based on a determination that the identified navigation event is not the predefined type of event, the processor 104 may not store the URL 110 and/or may discard the URL 110. In addition, the web browser 108 may navigate to the URL 110 or the web browser 108 may be redirected by a proxy server 124 as discussed herein.

The predefined type of event may include an event controlled by the user, for instance, the user typed the URL 110 into the address bar 112, pasted the URL 110 into the address bar 112, followed a link (e.g., from an email, a bookmark, or the like) that caused the URL to be entered into the address bar, and/or the like. According to examples, an event may not qualify as a predefined type of event if the user did not control the event, for instance, when the event is a redirect to the URL 110 by an application (e.g., by a javascript that automatically redirects to the URL 110), and/or the like.

The processor 104 may execute the instructions 202 to determine whether the web browser 108 received an instruction to navigate to a return URL. As discussed herein, the return URL may include a suffix domain for a proxy, e.g., a proxy server 124, and may not include the URL component 111 that is listed in the URL 110, which may also be referenced herein as the original URL 110. As also discussed herein, a proxy server 124 may receive the request to access the web page 120 corresponding to the URL 110 and may append a suffix domain to the URL 110. The proxy server 124 may also redirect the request to an identity provider 122, which may authenticate the user based on information that the user may have inputted. If authenticated, the identity provider 122 may return information, e.g., a token or other item that a service provider of the web page 120 corresponding to the URL 110 may use to grant the user access to resources on the web page 120. However, as the return URL may not include the URL component 111 that was included in the URL 110, when the proxy server 124 sends the return URL to the apparatus 102, the web browser 108 may navigate to a landing page of the return URL instead of the page corresponding to the URL component 111 that was listed in the URL 110.

In some examples, the processor 104 may determine whether the request was redirected to a predefined identity provider. That is, for instance, the processor 104 may maintain a list of predefined identity providers. An administrator or other entity may determine which identity providers are included in the list of the predefined identity providers and may update that list over time. In these examples, the processor 104 may determine whether the identity provider 122 to which the request was redirected matches one of the predefined identity providers in the list of predefined identity providers. In addition, the processor 104 may make the determination as to whether the web browser 108 received an instruction to navigate to a return URL based on a determination that the web browser 108 navigated to a predefined identity provider 122 included in the list of predefined identity providers.

In some examples, the processor 104 may determine whether the web browser 108 navigated to the predefined identity provider within a predefined number of redirects. The predefined number of redirects may be defined by an administrator or other entity and may be counted from when the web browser 108 initially attempted to navigate to the URL 110. By way of particular example, the predefined number of redirects may be 5, although the predefined number may be any number. In these examples, the processor 104 may make the determination as to whether the web browser 108 received the instruction to navigate to the return URL based on a determination that the web browser 108 navigated to a predefined identity provider included in the list of predefined identity providers within the predefined number of redirects.

However, in instances in which the request was redirected to an identity provider that is not on the list of predefined identity providers and/or the web browser 108 did not navigate to the predefined identity provider within the predefined number of redirects, the processor 104 may not determine whether the web browser 108 received the instruction to navigate to the return URL. Instead, the processor 104 may not intervene and/or may enable the web browser 108 to navigate to the web page corresponding to the return URL. In other words, the web browser 108 may navigate to a landing page of the return URL.

The processor 104 may execute the instructions 204 to, based on a determination that the web browser 108 received the instruction to navigate to the return URL, generate a modified URL 130 by appending the suffix domain to the URL 110. In other words, the processor 104 may append the suffix domain to the original URL 110 to generate the modified URL, which may restore context of the URL 110 for the proxy, e.g., the proxy server 124. In keeping with the example discussed above, the processor 104 may generate the modified URL to be http://www.xyz.com.suffixproxy.com/URLcomponent. In this regard, the modified URL may include the domain of the original URL 110, the suffix domain of the proxy server 124, and the URL component 111 of the original URL 110. As discussed herein, the URL 110 may have been stored in the data store 140 and the processor 104 may retrieve the URL 110 from the data store 140.

The processor 104 may execute the instructions 206 to navigate the web browser 108 to the modified URL 130. As the modified URL 130 may include the URL component 111 from the original URL 110, the web browser 108 may be directed to the web page 120 corresponding to the URL component 111 identified in the original URL 110. As discussed herein, doing so may reduce processor 104 resource and energy consumption.

Figure 3:
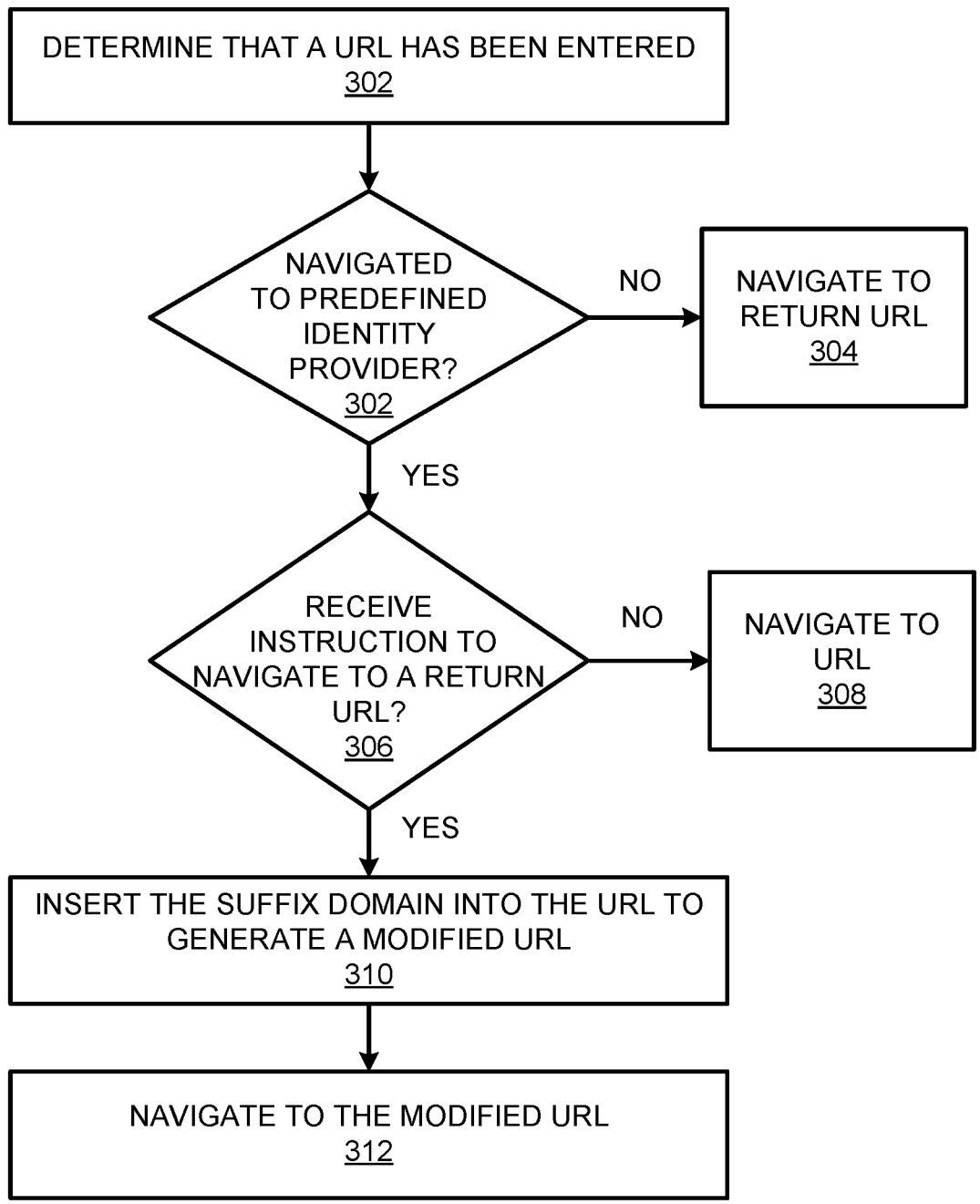
FIGS. 3 and 4, respectively, depict flow diagrams of methods for navigating a web browser to a modified URL, in which the modified URL may include a suffix domain and a URL component included in an original URL, in accordance with an embodiment of the present disclosure.
Figure 4:
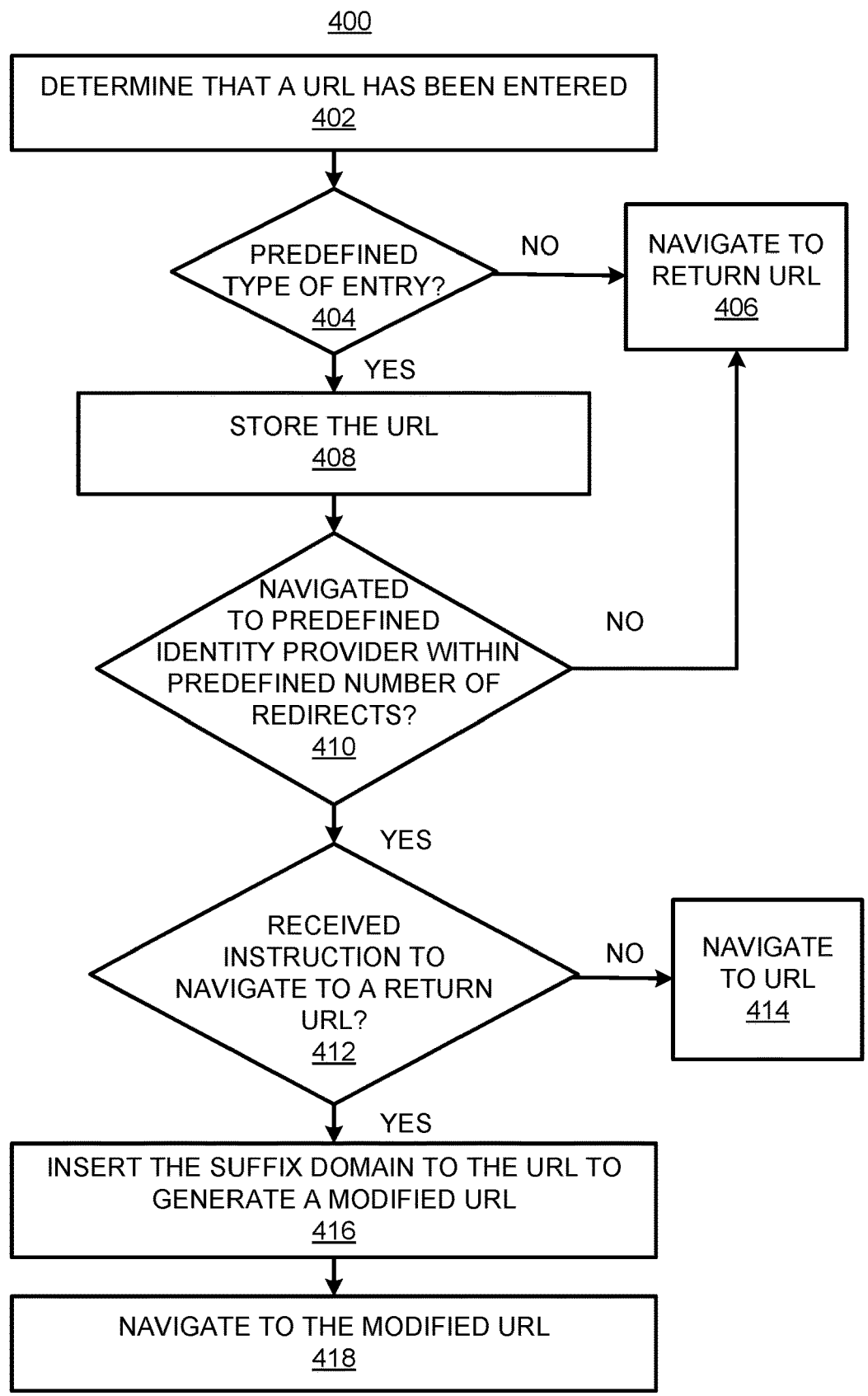

Various manners in which the processor 104 of the apparatus 102 may operate are discussed in greater detail with respect to the methods 300 and 400 respectively depicted in FIGS. 3 and 4. Particularly, FIGS. 3 and 4, respectively, depict flow diagrams of methods 300 and 400 for navigating a web browser 108 to a modified URL, in which the modified URL may include a suffix domain and a URL component 111 included in an original URL, in accordance with embodiments of the present disclosure. It should be understood that the methods 300 and 400 may include additional operations and that some of the operations described therein may be removed and/or modified without departing from the scope of the methods 300 and 400. The descriptions of the methods 300 and 400 are made with reference to the features depicted in FIGS. 1 and 2 for purposes of illustration.

With reference first to FIG. 3, at block 302, the processor 104 may determine that a URL 110 for a destination page (e.g., web page 120) has been entered into an address bar 112 of a web browser 108. As discussed herein, a plug-in or extension may have been installed on the web browser 108 and may determine when the URL 110 has been entered into the address bar 112. The URL 110 may have a domain and a URL component 111 (subdirectory) as noted in the following example URL 110 http://www.xyz.com/subdirectory. An example of a URL 110 that includes a query string ("lang") and a fragment part ("section2") is: "https://xyz.com/sample/help.html?lang=US#section2."

At block 304, the processor 104 may determine whether the web browser 108 navigated to a predefined identity provider 122 through a proxy server 124. As discussed herein, the proxy server 124 may redirect the web browser 108 to an identity provider 122 when a user of the web browser 108 is to be authenticated prior to being granted access to the web page 120 corresponding to the URL 110. In addition, the identity provider 122 may be a predefined identity provider if the identity provider 122 is on a list of predefined identity providers.

Based on a determination that the web browser 108 did not navigate to a predefined identity provider, the web browser 108 may navigate to a return URL at block 304. That is, for instance, when a proxy server 124 functions to handle communications to and from the web browser 108, a suffix domain may be added to the URL 110 as discussed herein. In these instances, the web browser 108 may navigate to the return URL, which may include the domain of the URL 110 and a domain of the suffix domain.

However, based on a determination that the web browser 108 navigated to the predefined identity provider 122, at block 306, the processor 104 may determine whether the web browser 108 received an instruction to navigate to a return URL instead of the URL 110. The return URL may include a suffix domain but may not include the URL component 111 as discussed herein.

Based on a determination that the web browser 108 did not receive the instruction to redirect to the return URL, at block 308, the web browser 108 may navigate to the URL 110. That is, for instance, a proxy server 124 may not have added the suffix domain to the URL 110 and thus, the web browser 108 may navigate to the URL 110, e.g., the web page 120 corresponding to the subdirectory listed in the URL 110.

However, at block 310, based on a determination that the web browser 108 did receive the instruction to navigate to the return URL, the processor 104 may insert the suffix domain of the return URL into the URL 110 to generate a modified URL. In keeping with one of the examples discussed above, the processor 104 may generate the modified URL to be http://www.xyz.com.suffixproxy.com/subdirectory. In this regard, the modified URL may include the domain of the original URL 110, the suffix domain of the proxy server 124, and the URL component 111 of the original URL 110. As discussed herein, the URL 110 may have been stored in the data store 140 and the processor 104 may retrieve the URL 110 from the data store 140. In addition, at block 312, the processor 104 may navigate the web browser 108 to the modified URL. In other words, the web browser 108 may navigate to the web page 120 corresponding to the URL component 111.

Turning now to FIG. 4, at block 402, the processor 104 may determine that a URL 110 for a destination page (e.g., web page 120) has been entered into an address bar 112 of a web browser 108. At block 404, the processor 104 may determine whether the entry of the URL 110 is a predefined type of entry. Based on a determination that the entry of the URL 110 is not a predefined type of entry, at block 406, the web browser 108 may navigate to a return URL. However, based on a determination that the entry of the URL 110 is a predefined type of entry, the processor 104 may store the URL 110 in a data store 140.

At block 410, the processor 104 may determine whether the web browser 108 navigated to a predefined identity provider 122 within a predefined number of redirects. Based on a determination that the web browser 108 did not navigate to the predefined identity provider or did not navigate to the predefined identity provider within the predefined number of redirects, at block 406, the web browser 108 may navigate to the return URL.

However, based on a determination that the web browser 108 navigated to the predefined identity provider within the predefined number of redirects, at block 412, the processor 104 may determine whether the web browser 108 received an instruction to navigate to a return URL instead of the URL 110. The return URL may include a suffix domain and may not include the URL component 111 from the original URL 110 as discussed herein.

Based on a determination that the web browser 108 did not receive the instruction to navigate to the return URL, at block 414, the web browser 108 may navigate to the URL 110. However, at block 416, based on a determination that the web browser 108 did receive the instruction to navigate to the return URL, the processor 104 may insert the suffix domain of the return URL into the URL 110 to generate a modified URL. In addition, at block 418, the processor 104 may navigate the web browser 108 to the modified URL, e.g., to a web page 120 corresponding to the URL component 111 listed in the original URL 110.

Some or all of the operations set forth in each of the methods 300 and 400 may be included as utilities, programs, or subprograms, in any desired computer accessible medium. In addition, each of the methods 300 and 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
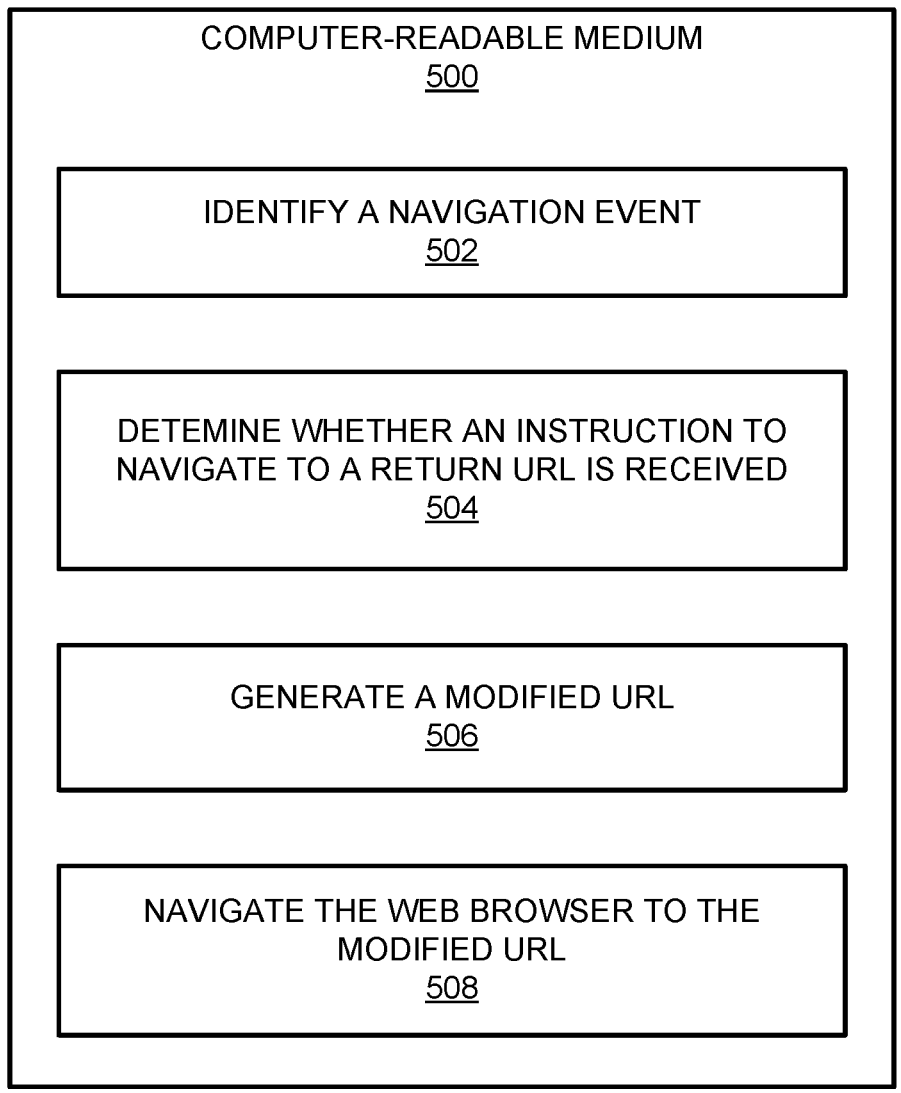
FIG. 5 depicts a block diagram of a computer-readable medium that may have stored thereon computer-readable instructions for navigating a web browser to a modified URL, in which the modified URL may include a suffix domain and a page identifier to cause the web browser to navigate to a web page corresponding to the page identifier, in accordance with an embodiment of the present disclosure.

Turning now to FIG. 5, there is shown a block diagram of a computer-readable medium 500 that may have stored thereon computer-readable instructions for navigating a web browser 108 to a modified URL, in which the modified URL may include a suffix domain and a URL component 111 to cause the web browser to navigate to a web page corresponding to the URL component 111, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon computer-readable instructions 502-508 that a processor, such as the processor 104 depicted in FIGS. 1 and 2, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to identify a navigation event responsive to a uniform resource locator (URL) 110 being entered into an address bar 112 of a web browser 108, the URL 110 having a domain and a URL component 111. The processor may fetch, decode, and execute the instructions 504 to determine whether the web browser 108 received an instruction to navigate to a return URL instead of the URL 110. As discussed herein, the return URL may include a suffix domain and may not include the URL component 111 from the URL 110. The processor may fetch, decode, and execute the instructions 506 to, based on a determination that the web browser 108 received the instruction to navigate to the return URL, generate a modified URL by inserting the suffix domain from the return URL into the URL 110 while maintaining the URL component 111 from the URL 110. In addition, the processor may fetch, decode, and execute the instructions 508 to navigate the web browser 108 to a web page corresponding to the subdirectory included in the modified URL.

As discussed herein, the processor may also determine whether the identified navigation event is a predefined type of event, in which the predefined type of event may include a typing of the URL 110 into the address bar 112, a copying of the URL 110 into the address bar 112, and/or a following of a link that causes the URL 110 to be entered into the address bar 112. In addition, the processor may store the URL 110 in a data store 140 based on the identified navigation event being the predefined type of event.

As also discussed herein, the processor may determine whether the web browser 108 navigated to a predefined identity provider and may determine whether the web browser 108 received the instruction to navigate to the return URL based on a determination that the web browser 108 navigated to the predefined identity provider 122. In addition or alternatively, the processor may determine whether the web browser 108 navigated to the predefined identity provider 122 within a predefined number of redirects and may determine whether the web browser 108 received the instruction to navigate to the return URL based on a determination that the web browser 108 navigated to the predefined identity provider 122 within the predefined number of redirects.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine-readable instructions that cause the processor to:
      responsive to a uniform resource locator (URL) being received in an address bar of a web browser, identify a navigation event, the URL having a domain and a URL component that comprises at least one of:
      a subdirectory;
      a query string; and
      a URL fragment part;
      determine that the web browser received an instruction to navigate to a return URL that includes a suffix domain for a proxy and does not include the URL component from the URL;
      generate a modified URL by appending the suffix domain to the URL to restore context of the URL for the proxy; and
      navigate the web browser to the modified URL.

2. The apparatus of claim 1, wherein the instructions cause the processor to:
   determine whether the identified navigation event is a predefined type of event; and
   store the URL in a data store based on the identified navigation event being the predefined type of event.

3. The apparatus of claim 2, wherein the predefined type of event comprises of the URL being typed into the address bar, the URL being pasted into the address bar, and/or of a link being followed that causes the URL to be entered into the address bar.

4. The apparatus of claim 1, wherein the instructions cause the processor to:
   determine whether the identified navigation event is a predefined type of event; and
   discard the URL based on the identified navigation event not being the predefined type of event.

5. The apparatus of claim 1, wherein the instructions cause the processor to:
   determine whether the identified navigation event is a predefined type of event; and
   navigate to the return URL based on a determination that the identified navigation event is not the predefined type of event.

6. The apparatus of claim 1, wherein the instructions cause the processor to:
   determine whether the web browser navigated to a predefined identity provider; and
   determine whether the web browser received the instruction to navigate to the return URL based on a determination that the web browser navigated to the predefined identity provider.

7. The apparatus of claim 6, wherein the web browser is to navigate to the return URL based on a determination that the web browser did not navigate to the predefined identity provider.

8. The apparatus of claim 6, wherein the instructions cause the processor to:
   determine whether the web browser navigated to the predefined identity provider within a predefined number of redirects; and
   determine whether the web browser received the instruction to navigate to the return URL based on a determination that the web browser navigated to the predefined identity provider within the predefined number of redirects.

9. The apparatus of claim 8, wherein the web browser is to navigate to the return URL based on a determination that the web browser did not navigate to the predefined identity provider within the predefined number of redirects.

10. A method comprising:
    determining, by a processor, that a uniform resource locator (URL) for a destination page has been received in an address bar of a web browser, the URL including a domain and a URL component that comprises at least one of:
    a subdirectory;
    a query string; and
    a URL fragment part;
    determining, by the processor, that the web browser navigated to a predefined identity provider through a proxy server;
    determining, by the processor, that the web browser received an instruction to navigate to a return URL instead of the URL, wherein the return URL includes a suffix domain of the proxy server and does not include the URL component in the URL; and
    inserting, by the processor, the suffix domain of the return URL into the URL to generate a modified URL; and
    navigating the web browser to a web page corresponding to the URL component included in the modified URL.

11. The method of claim 10, further comprising:
    determining whether entry of the URL into the address bar is a predefined type of entry; and
    storing the URL in a data store based on the entry of the URL being the predefined type of entry.

12. The method of claim 11, wherein the predefined type of entry comprises the URL being typed into the address bar, of the URL being pasted into the address bar, and/or a link being followed that causes the URL to be entered into the address bar.

13. The method of claim 11, further comprising:
navigating to the return URL based on a determination that the entry of the URL is not the predefined type of entry.

14. The method of claim 10, further comprising:
determining whether the web browser navigated to the predefined identity provider within a predefined number of redirects; and
determining whether the web browser received the instruction to navigate to the return URL based on a determination that the web browser navigated to the predefined identity provider within the predefined number of redirects.

15. The method of claim 14, further comprising:
navigating to the return URL based on a determination that the web browser did not navigate to the predefined identity provider within the predefined number of redirects.

16. The method of claim 10, wherein the return URL does not include the URL component in the URL.

17. A non-transitory computer-readable medium on which is stored computer-readable instructions that when executed by a processor, cause the processor to:
identify, responsive to a uniform resource locator (URL) being received in an address bar of a web browser, a navigation event, the URL having a domain and a URL component that comprises at least one of:
a subdirectory;
a query string; and
a URL fragment part;
determine that the web browser received an instruction to navigate to a return URL from a proxy server, wherein the return URL includes a suffix domain and does not include the URL component; and
generate a modified URL by inserting the suffix domain into the URL while maintaining the URL component; and
navigate the web browser to a web page corresponding to the URL component included in the modified URL.

18. The non-transitory computer-readable medium of claim 17, wherein the instructions further cause the processor to:
determine whether the identified navigation event is a predefined type of event, wherein the predefined type of event comprises the URL being typed into the address bar, the URL being copied into the address bar, and/or a link being followed that causes the URL to be entered into the address bar; and
store the URL in a data store based on the identified navigation event being the predefined type of event.

19. The non-transitory computer-readable medium of claim 17, wherein the instructions further cause the processor to:
determine whether the web browser navigated to a predefined identity provider; and
determine whether the web browser received the instruction to navigate to the return URL based on a determination that the web browser navigated to the predefined identity provider.

20. The non-transitory computer-readable medium of claim 19, wherein the instructions further cause the processor to:
determine whether the web browser navigated to the predefined identity provider within a predefined number of redirects; and
determine whether the web browser received the instruction to navigate to the return URL based on a determination that the web browser navigated to the predefined identity provider within the predefined number of redirects.

* * * * *